United States Patent [19]

Meldner et al.

[11] Patent Number: 5,470,632
[45] Date of Patent: Nov. 28, 1995

[54] COMPOSITE MATERIAL FOR FABRICATION OF SAILS AND OTHER ARTICLES

[75] Inventors: Heiner Meldner, Burlingame, Calif.; Roland J. Downs, Mesa, Ariz.

[73] Assignee: America[3] Foundation, West Palm Beach, Fla.

[21] Appl. No.: 276,541

[22] Filed: Jul. 18, 1994

Related U.S. Application Data

[62] Division of Ser. No. 978,095, Nov. 17, 1992, Pat. No. 5,333,568.
[51] Int. Cl.[6] ........................................ B32B 5/12
[52] U.S. Cl. .................... 428/110; 156/167; 156/179; 156/275.5; 428/105; 428/292; 428/294; 428/296; 428/297; 428/298; 428/448; 428/902
[58] Field of Search .................... 428/105, 109, 428/110, 111, 292, 293, 294, 296, 297, 298, 902, 448; 156/167, 179, 275.5

[56] References Cited

U.S. PATENT DOCUMENTS

| | | | |
|---|---|---|---|
| 4,916,000 | 4/1990 | Li et al. | 428/105 |
| 5,112,667 | 5/1992 | Li et al. | 428/105 |
| 5,354,605 | 10/1994 | Lin et al. | 428/105 |

*Primary Examiner*—James J. Bell
*Attorney, Agent, or Firm*—Robert K. Tendler

[57] ABSTRACT

An improved reinforced laminate for use in sails or other flexible sheet or membrane applications utilizes a pull-truded thin lightweight reinforcing sheet of unidirectional extruded monofilaments in which the reinforcing sheet or sheets form one or more uni-tapes laminated to a polymer film such as Mylar, or other extended sheet of material. The monofilaments are uniformly embedded in the uni-tape via an elastomeric polymer matrix, with the reinforcing sheet, when incorporated into sails via lamination resulting in sails with reinforcing monofilaments having diameters 5 times less than conventional strands or threads. The use of small diameter monofilaments greatly increases the monofilament-over-monofilament crossover density, resulting in a dramatic increase in shear strength, and Youngs' Modulus, with an accompanying dramatic decrease in weight. In one embodiment the improvement in specific modulus over conventional sail laminates is about six-fold. For example, at only one-third the weight, stretch resistance is two times better. In a preferred embodiment, autoclaving is used in the lamination process to rid the laminate of voids which dramatically reduce shear strength by as much as 30 percent. Alternative void-free laminating processes include a silicone interliner/heated platen technique.

15 Claims, 5 Drawing Sheets

$$\frac{CROSSOVER}{DENSITY} = \left(\frac{DIAMETER}{SPACING}\right)^2 = \left(\frac{1}{20}\right)^2 = \frac{1}{400}$$

$$\frac{CROSSOVER}{SPACING} = \left(\frac{DIAMETER}{SPACING}\right)^2 = \left(\frac{1}{2}\right)^2 = \frac{1}{4}$$

COMPOSITE MATERIAL FOR FABRICATION OF SAILS AND OTHER ARTICLES

This is a divisional of application(s) Ser. No. 07/978,095 filed on Nov. 17, 1992 now U.S. Pat. No. 5,333,568.

FIELD OF INVENTION

This invention relates to a flexible reinforced material for sail making and other applications which require high modulus and high shear strength flexible sheets and more particularly to the manufacture of a laminate reinforced by extruded monofilaments.

BACKGROUND OF THE INVENTION

The provision of sails for sailing vessels, and particularly those which race, presents the sailmaker with problems of not only the shape of the sails, but also the materials that are to be used, all in an effort to provide maximum speed under a wide variety of wind conditions. Not only is sail shape critical, rip resistance, UV life and the weight of the sails are all important factors in competitive sailboat racing.

As will be appreciated, in sailboat racing the disadvantage of a ripped sail computes to a minimum of 30 seconds for a sail change and can often result in the loss of a race and even the inability to remove the sail from the mast or forestay. Ripping or tearing of sails can also result in replacement with a non-optimal sail, making the boat less competitive.

Moreover, and especially with respect to upwind efficiency, the shape of the sail is critical. If the sail cannot maintain its originally-designed shape after initial wind gust loadings, a boat carrying this sail will also be rendered non-competitive.

Additionally, assuming the problems of rip resistance and shape have been solved, inertia effects make the boat carrying the lighter sails the most competitive.

All of the above militates towards the provision of new lightweight materials which are reinforced for strength and which are both flexible and foldable, while at the same time maintaining the designed shape.

Woven sailcloth has existed for many years as the preferred material in the fabrication of sails. Sailcloth in general involves the utilization of threads or strands in which fibers are twisted or spun together, often producing threads or strands with 1 thousand to 1 million yarns per strand. The thickness of these threads or strands is on the order of $4/1000$ of an inch or 100 microns in diameter to $1/10$ of an inch or 2500 microns in diameter. Whether woven or not, because of the relatively large diameter of threads or strands, making sails with threads or strands precludes improved performance mainly because the strength of the sails made in this fashion cannot be significantly increased. Nor can the weight of the sails be significantly decreased.

As is known, the shear strength of such a sailcloth or fabric is determined by the density or number of crossover points between warp yarns and weft yarns This is true regardless of whether the structure is woven or merely is the result of overlying of strand upon strand. The crossover density ratio is given by $(\text{diameter/spacing})^2$. In a typical instance where ten mil strands or threads are utilized, with crossovers at 200 mil spacings, the density is a meager $1/400$. This is an exceedingly low crossover density such that if such strands or threads are utilized to reinforce a laminate, for instance, of Mylar, the resulting material derives very little shear strength benefit from reinforcing strands. There the shear strength of the sail relies solely on the shear strength of the Mylar. It will be seen that a woven or non-woven structure of threads or strands cannot significantly improve shear strength of sails made in the traditional manner.

The reason, is that shear strength depends directly upon the number of crossovers, the points at which adhesive bonding attachment within the material is achieved. Low crossover densities determined by the relatively large diameter of the threads or strands in conventional sails makes a tight weave or lattice having large numbers of crossovers impossible.

It will be appreciated that were the strand or thread diameter to be reduced, for instance, to 5 microns, then the crossover density would increase by two orders of magnitude. Typically, aside from the weight reduction associated with providing very small diameter threads or strands, the crossover density could be improved over common thread or strand structures by a factor of 100 to 1 million if 5 micron diameter thread was available. However, such small diameter threads or strands do not exist.

As described in U. S. Pat. Nos. 4,679,519 and 4,708,080 to Linville and Conrad respectively, in order to provide a laminated sail material, non-woven strands or threads are lined up in a preferred direction, initially with no crossovers whatsoever. Thereafter, a second layer of strands is placed on top of these strands, with the second set of strands running in a different direction such that crossovers exist. However, even in this case the crossover density is exceedingly low due to the large diameter of the strands. Were the crossover density to be increased through the utilization of extremely small diameter strands, improved shear strength would result, with the desired goal being to achieve a shear strength ten times that of the Linville material.

Moreover, in terms of the specific Youngs' Modulus of the material with reinforcing elements reduced in diameter by 5 times and an optimally mixed hybrid of carbon and polymer monofilaments, such a sail material would be at least six times better than that presently producable.

It will, of course, be appreciated that with massive numbers of crossovers there would be exceptional rip resistance, and should the sail material start to tear it would abruptly stop, a point critical in sailboat racing, where materials are stretched to their outer limits.

The problem is one of finding a method of fabricating a reinforcing material in which the reinforcing elements are of exceptionally small diameter, while at the same time having increased or better yield strength and modulus. It is also important to provide increased crossover density through the use of newer materials, assuming that the crossover bonds can be made secure.

Even having developed such a light material with significantly increased shear strength, it is important for sails that the material not be deformed by stretching under load. As will be appreciated with all types of woven sails, since the yarns, when woven, are in an over-under zig-zag pattern in which the threads or yarns are bent across each other, when the woven structure is subjected to loading, the crossovers between the warps and the wefts are pulled so that the crossover is flattened at the overlap. What this means is that after the first major load is experienced by the material, the material does not return to its initially designed shape. The failure of the crossover to return to its original shape is referred to in the industry as the crimp problem in which the crossover stays flattened instead of returning to its original crimped over-under zig-zag shape. i.e., crimp causes a substantial nonlinearity in the stress-strain curve of the composite fabric. Hysteresis in the crimp relaxation process gives rise to permanent fabric stretch distorting the originally designed sail shape.

Since all sails are built with unloaded material, all sails built in this manner will lose shape under wind load. This causes sailmakers problems in the design of the sails because the amount of sail shape distortion is unpredictable. Because of this unpredictability, sails must be cut and recut after use to achieve the final desired shape.

The crimp problem is exacerbated the larger is the diameter of the threads or strands, due to the exaggerated over-under zig-zag of wefts and warps. Thus, because of the relatively large diameter of the strands or threads used in conventional sailmaking and the exaggerated over-under zig-zag or crimp, sail shape design is often a tedious cut-and-dry procedure.

Note, crimp-related problems are especially acute when dealing with large numbers of panels in a sail. Recutting of such sails after initial wind loading often requires recutting of each sail panel, a time consuming process which could be alleviated if crimp effects could be substantially eliminated.

In summary, crimp causes uncontrollable shape deterioration during the initial wind loads. This dramatically reduces the racing life of a sail and adds substantially to the trial and error sail design cycle. When a sail uses an assembly of a large number of specially oriented and shaped pieces, the crimp problem is even more severe due to the amount of recutting involved in achieving the desired sail shape. Thus, any sail material which reduces the magnitude of the over-under zig-zag or crimp is highly desirable. As will be seen, this can be accomplished by drastically reducing the diameter of the warp and weft-like reinforcing elements in a laminated material.

Another problem associated with laminated sails is the problem of voids. In the Linville system, with ordinary pressure lamination, substantial voids exist because of the gas which evolves during the lamination process. Typically three percent voids by volume reduces shear strength by 30 percent, which renders laminated sails devoid of the potential increased shear strength that can be achieved through reinforcing structures within the laminate.

By way of further background, while much of the art involved in making laminates comes from the aerospace industry in which carbon fiber structures and laminates are common, these structures and laminates are not well suited where flexible or foldable material is required. This is because the resin systems utilized are designed for rigid structures. Thus, carbon fiber masts and booms, and carbon fiber structural elements in aircraft have utilized manufacturing techniques for providing carbon elements in rigid epoxy matrices or binders. Such carbon fiber systems cannot be used where flexible and foldable material is required. Moreover, such systems are not readily adapted to sailmaking due to the unique dynamic conditions applying to the design of sails.

SUMMARY OF THE INVENTION

Rather than utilizing threads or strands or fibers which are twisted on themselves, in the Subject Invention extruded monofilaments of carbon and/or extended chain polymer, having diameters on the order preferably of 5 to 10 microns, are utilized as the reinforcing elements in a flexible laminated material, whose stretch resistance and shear strength is dramatically increased due to the ability to maximize the number of monofilament crossovers because of the exceedingly small diameter of the monofilaments, while at the same time reducing the overall weight of the material.

As an added benefit, reducing the reinforcing element diameter by a factor of at least 5 also limits problems with crimp. Thus any over-under zig-zagging which occurs during the lamination processes is also limited due to the small diameter of the monofilaments. As a result, crimp related settling does not occur in this material which makes it an ideal material for sails. Improved crossover density with 5 micron filaments on 10 micron centers produces a crossover density of $(½)^2$ or ¼ which produces at least an order of magnitude improved shear strength over the best of the laminates as exemplified by the Linville and Conrad laminated sail cloth. The improved shear strength is in part due to the 100 times increased crossover density and due to the increased Youngs' Modulus associated with extruded monofilament carbon.

Moreover, the interfacial bonds between densely packed monofilaments are much more secure than those associated with strands, threads or twisted fibers. This is because overlying strands or threads only have mechanical contact at the outer fibers within the twisted structure. As a result, the contact between overlying strands or threads is made only on a very small percent of the fibers of the twisted strand. With the majority of fibers within the strand or thread being only marginally adhesively bound or mechanically bound to fibers of a crossing strand or thread.

On the other hand, when sails are reinforced with monofilaments, each monofilament touches each overlying monofilament.

The result of making a material of such a nature is that sails made of such materials are already flat so they do not have crimp problems. They have an exceptionally long lifetime, high UV resistance, a low weight and have a high associated shear strength with increased rip resistance such that the material is ideal for spinnakers or many types of down wind sails. In fact, the rip resistance is such that even if the sail begins to rip after being punctured, unlike conventional sails, it will not continue to rip due to the massive crossover structure, which makes dousing a ripped sail in sailboat racing a thing of the past.

Most importantly, aside from weight, the sails maintain their high performance shape as originally designed, because they eliminate problems associated with crimp. Because these sails do not change shape on initial loading, eliminating crimps eliminates the usual trial and error recutting of sails during sail design. Also, because of the strength of the sail material in a variety of different directions, fewer panels are needed, resulting in fewer flattened overlaps which cause sail shape problems and will add to the total sail weight.

In fact, the reinforcing structure within the subject material can be compared favorably to the difference between tree trunks crisscrossing each other to form a lattice structure, as opposed to crisscrossed tooth picks, so dramatic is the diameter difference. The monofilament layer reinforcement approaches the level of a true micro-composite.

In summary, an improved reinforced material for use in sails or other flexible sheet or membrane applications utilizes thin sheets of unidirectional extruded monofilaments of carbon and extended chain polyethylene or liquid crystal polymers uniformly embedded in a polymer matrix. The reinforcing sheet or sheets of monofilaments are oriented in predetermined directions and laminated between polymer films to form a structure which provides improved specific tensile and shear strength and modulus as well as improved dimensional stability under repeated loading. In one embodiment, 2–8 reinforced sheets oriented in different directions are used as the reinforcing material between the polymer films. The cross sectional diameter of the monofilaments typically has an average ranging from 3 to 15 microns, which is more than 5 times less than that of any strands or threads normally used as reinforcing elements both in woven and unwoven sailcloth or laminates.

In one embodiment, the laminate is reinforced with carbon and/or polymer monofilaments which are initially supplied as rolls of thin bands with protective coatings or "sizing", in which 60 to 12,000 three to fifteen micron diameter monofilaments are embedded. A plurality of bands are pretreated for improved adhesion, combined with an elastomeric thermoset consisting of polyurethane and polyester resins utilizing an isocyanate curing agent and backed with release sheets. This assembly is pull-truded through a constant gap rotary die to form a flat, continuous, and uniformly thick amalgamated sheet of densely packed, uniformly dispersed monofilaments embedded in the resin matrix. This sheet is defined here as a uni-tape having an approximate 10 micron thickness and a weight of 10–30 grams/meter$^2$ which is an order of magnitude lighter than standard carbon fiber carrying tapes. It is this lightweight thin sheet which is utilized as the reinforcing material that is laminated between the outer layers of film to form the reinforced flexible and foldable sheet or membrane.

More particularly, an improved pull-truded reinforcing material for use in sails and other applications includes the utilization of extruded monofilaments in a laminated structure to provide improved shear strength in which the reinforcing monofilaments are oriented in a predetermined direction within the laminate, with the cross sectional diameter of the monofilaments being more than 5 times less than that associated with strands or fibers normally used as strength-enhancing or reinforcing elements both in woven and unwoven sailcloth or laminates. In one embodiment, the laminate is reinforced with carbon monofilaments initially supplied with temporary epoxy or sizing, in which 60 to 12,000 five micron diameter monofilaments are provided in a band having significant lateral extent but only about ten micron thickness. A plurality of bands, as many as 1,000, located side by side, are passed through a solvent to remove the sizing, are coated with an elastomeric resin, and are passed through a constant gap rotary die to provide a flat amalgamated band of unified tapes called a uni-tape which is utilized as the reinforcing material between the outer sheets of the laminate. In one embodiment, these outer sheets are made of mylar. Alternatively, the uni-tape may be adhered to only a single sheet of material such as mylar. Further, an optional monofilament treatment step can precede the resin both for improving the adhesive bonding features of the outer surface of the monofilament, e.g., via chemical etching, plasma arc etching or corona discharge.

Whether a sandwich construction is utilized or whether the flat band is adhered to a single sheet, in one embodiment, the material is formed through an autoclaving process in which the sandwich structure is itself sandwiched between two plastic layers or one layer against a backing plate forming a vacuum bag. In a preferred embodiment, flat bands of uni-tape are laid out in different directions, one on top of the other between the mylar outer sheets to provide multiple directions of reinforcement.

When autoclaving, the sandwich structure is squeezed and heated at, for instance, 200 psi and 250° F. for ten hours. The processing is divided into at least two stages with a compaction phase resulting in a specialized resin of polyurethane and polyester flowing around all the layers and into the gaps between the monofilaments to assure adherence plus flexibility. This is followed by a curing phase for the resin polymer. The result is a three-dimensional flexible matrix of optimal bonds between the monofilaments themselves, and between the monofilaments and the overlying or underlying sheets. The result is sail material of extremely long lifetime, high UV resistance, low weight, exceptionally high shear strength and rip resistance while at the same time providing for the maintenance of the high performance sail shape originally designed because of the complete absence of crimp related settling under load.

The purpose of the autoclaving is to drive any evolved gas into solution, with the autoclaving process overpressure being responsible for driving the gas into solution. The result is that the laminated structure has no gas voids. Alternatively, voids in the laminated structure may be eliminated by other techniques. One such technique involves providing the laminated elements with an interleaf or layer of silicone, with the structure being clamped and heated. The heat expands the silicone both to complete the lamination process and to provide sufficient pressure to drive evolved gas into solution. After lamination, the silicone layer or interleaf is removed.

While the subject invention had its genesis in the art of sailmaking, the subject reinforcing material has utility in a wide variety of applications in which flexible reinforced laminates are useful, such as parachutes, inflatables including balloons or airbags, tents, electromagnetically transparent windows, sonar sound transmitting windows, pressurized space suits, tires, drive belts, bullet proof vests, and tension structures used in the building trades for roof and ceiling applications.

BRIEF DESCRIPTION OF THE DRAWINGS

These and other features of the Subject Invention will be better understood in conjunction with the Detailed Description taken in conjunction with the Drawings of which.

DETAILED DESCRIPTION

Figure 1:
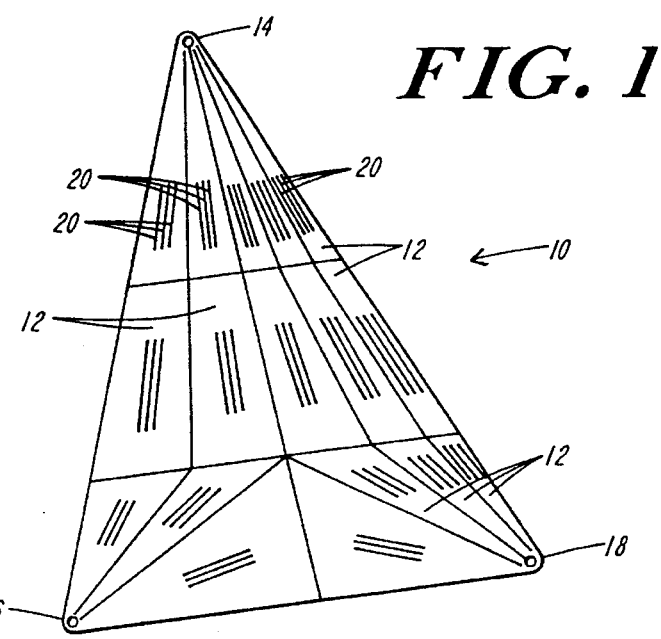
FIG. 1 is a diagrammatic representation of a sail having panels, with the major directions of stress in the panels as illustrated.

Referring now to FIG. 1 a typical sail 10 is provided with a number of panels 12 arranged between the head 14 and either the tack 16 or the clew 18 of the sail. Each of these panels is typically designed such that the major direction of strength of each panel is along the major stress lines, here indicated by referenced character 20. The purpose of using many panels in a sail is to take advantage of the particular directional properties of the sail material to accommodate the various forces occasioned by the wind loading of the sail. A large number of panels is necessary because, prior to the Subject Invention, the shear strength for common laminates was not sufficient to enable the fabrication of the sail with a single panel or with a reduced number of panels. It will be appreciated that the larger the number of panels the more weight overhead is generated by the added stitching that is required.

While in the past reinforcing strands or threads have been utilized in sailcloth in which the strands or threads are aligned with the above-mentioned principal stress direction, bias strength, shear strength or modulus are far from being optimal, regardless of the weight of the sail because the crossover density when utilizing strands or threads cannot approximate those available utilizing small diameter monofilaments.

Figure 2:
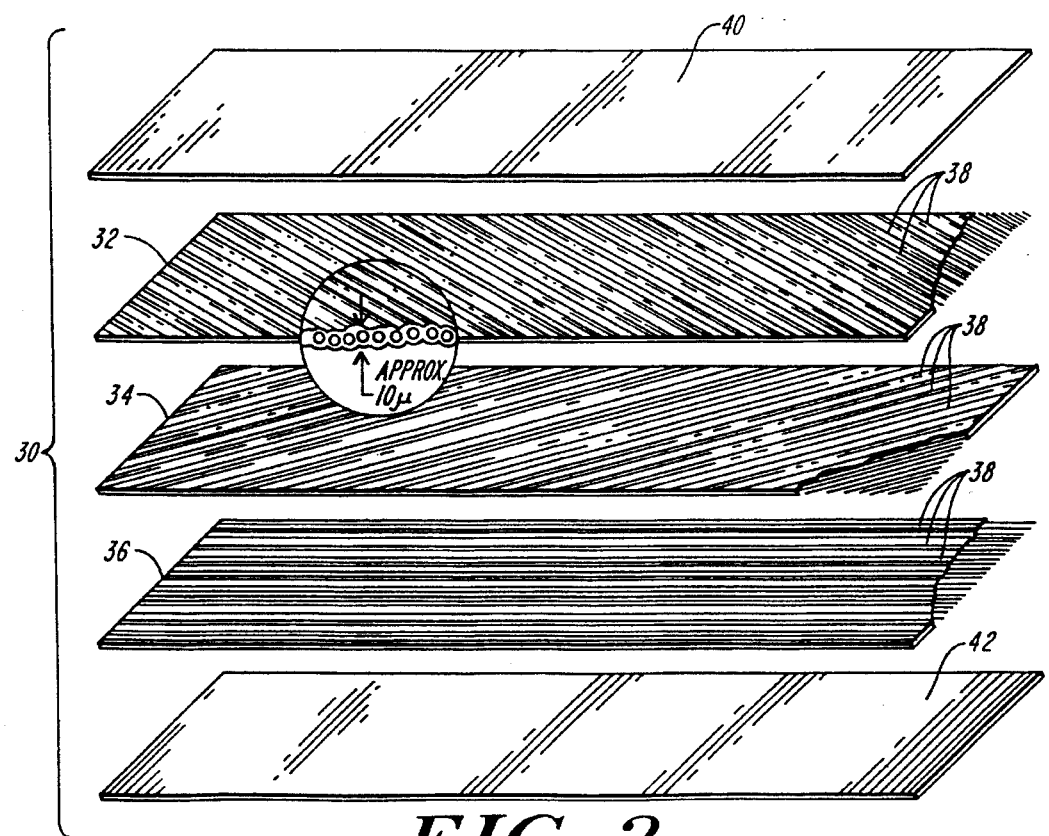
FIG. 2 is a exploded view of the subject laminate illustrating the monofilament reinforcing members lying across each other at various directions to provide the material with reinforcement mainly in these directions.

Referring now to FIG. 2, a laminate 30 utilizes unidirectional or so-called uni-tapes 32, 34 and 36, each having extruded monofilaments in a pull-truded tape, located between an upper film 40 and a lower film 42, with each uni-tape having an approximate thickness of 10 microns. Each uni-tape is provided with 50 to 85 percent monofilaments by volume with the monofilaments being provided with a carrier of bonding resin 44 which forms a matrix that includes monofilaments and resin.

It will be appreciated that each of the uni-tapes 32, 34 and 36 has longitudinal monofilaments 38 which extend from one edge of the completed uni-tape to the other in a single direction.

These monofilaments are commercially available reinforcing materials which fall into a number of categories or types as indicated in Table I hereinafter.

The first type is a inorganic carbon/carbon fiber in which a tow or band is available having 1000 and 12,000 monofilaments per tow. The next class of monofilaments is an inorganic silicon which is available as an HS fiber glass monofilament with between 20 and 1000 monofilaments per tow. A third class is a monofilament aramid, having a denier of between 55 and 3,000. Additionally, there is a class of monofilaments characterized by an organic ordered polymer in the form of liquid crystals having between 50 and 2,500 monofilaments per tow.

Moreover, there are extended chain polyethylene monofilaments with between 30 and 960 monofilaments per tow, whereas a further class includes polyesters with deniers of 7 to 2,000. Another class of monofilaments is nylon, having denier of 5 to 2,000. Further, there are engineering thermoplastic monofilaments having a denier 5 to 1,000. Finally, there is a class of monofilaments incorporating boron and/or ceramics, having 10 to 1,000 monofilaments per tow.

TABLE I

REINFORCEMENT MATERIAL

1) Monofilament Class/Type: Inorganic Carbon/Carbon Fiber

| Tow Designation | Monofilaments/Tow | Manufacturer/Supplier |
|---|---|---|
| AS4 | 3000 to 6000 | Hercules Inc., USA |
| IM4 | 1000 to 6000 | " |
| IM7 | 1000 to 6000 | " |
| IM8 | 1000 to 12000 | " |
| IM9 | 1000 to 6000 | " |
| T700 | 1000 to 12000 | Toraj, JAPAN |
| T800 | 1000 to 12000 | " |

2) Monofilament Class/Type: Inorganic Silicon/HS Fiber Glass

| Tow Designation | Monofilaments/Tow | Manufacturer/Supplier |
|---|---|---|
| S2-Glass | 20 to 1000 | Owens Corning Fiber, USA |
| RH-Glass | 20 to 1000 | Vetrotex Co., FRANCE |

3) Monofilament Class/Type: Organic Polymer/Aramid

| Tow Designation | Denier (g/9 Km) | Manufacturer/Supplier |
|---|---|---|
| Kevlar 29 | 200 to 3000 | DuPont, USA |
| Kevlar 129 | 100 to 2500 | " |
| Kevlar 49 | 55 to 2500 | " |
| Kevlar 149 | 55 to 2500 | " |
| Technora | 55 to 3000 | Peijin, JAPAN |
| Twarlon | 55 to 3000 | Akfo, JAPAN |

4) Monofilament Class/Type: Organic Polymer/Ordered Polymer

| Tow Designation | Monofilaments/Tow | Manufacturer/Supplier |
|---|---|---|
| Vectran | 50 to 2500 | Hoechst-Celanese, USA |
| PBO | 50 to 2500 | Dow Chemical, USA |

5) Monofilament Class/Type: Organic Polymer/Extended Chain Polyethylene

| Tow Designation | Monofilaments/Tow | Manufacturer/Supplier |
|---|---|---|
| Spectra 900 | 60 to 480 | Allied Signal, Inc., USA |
| Spectra 1000 | 30 to 960 | Allied Signal, Inc., USA |
| Dyneema | 60 to 960 | Peijin, JAPAN |

6) Monofilament Class/Type: Organic Polymer/Polyester

| Tow Designation | Denier (g/9 Km) | Manufacturer/Supplier |
|---|---|---|
| Dacron | 7 to 500 | DuPont, USA |
| Polyester | 10 to 1000 | Hoechst-Celanese, USA |
| Compet | 100 to 2000 | Allied Signal, Inc., USA |

7) Monofilament Class/Type: Organic Polymer/Nylon

| Tow Designation | Denier (g/9 Km) | Manufacturer/Supplier |
|---|---|---|

TABLE I-continued

REINFORCEMENT MATERIAL

| | | |
|---|---|---|
| Nylon | 5 to 2000 | DuPont, USA |

8) Monofilament Class/Type: Organic Polymer/Engineering Thermoplastic

| Tow Designation | Denier (g/Km) | Manufacturer/Supplier |
|---|---|---|
| PEEK | 5 to 1000 | ICI-Fiberite, Inc., USA |
| PPS | 5 to 1000 | Phillips Petroleum, USA |

9) Monofilament Class/Type: Boron and Ceramic/Boron, Ceramic

| Tow Designation | Monofilaments/Tow | Manufacturer/Supplier |
|---|---|---|
| BORON Fiber | 10 to 1000 | AVCO-TEXTRON, USA |
| CERAMIC Fiber | 10 to 1000 | AVCO-TEXTRON, USA |

Typically a tow or band has a width of less than ⅛ of an inch, with as many as 1,000 tows or bands being located side by side and pull-truded into a tape as wide as 27 to 60 inches through the marrying of the individual tows together via a rotary die pull-trusion process. It will be appreciated the combinations of the above are reinforcing elements and can be utilized in the final uni-tape by co-locating tows of different monofilaments prior to the pull-trusion process. In this matter tows of a different material alternate at some interval across the width of the finished uni-tape.

It will be appreciated that due to the 5 to 20 micron diameter of the monofilaments, the crossover density as described above, can be increased dramatically.

Prior to describing the effect of the increased crossover density, the films between which the uni-tape can be laminated are common commercially available film materials such as listed in Table II herein below. These include the popular Mylar, Tedlar and Vectran materials, as well as the utilization of Kapton and liquid crystal polymer films in some instances.

TABLE II

FILM MATERIALS

| Type Designation | Thickness (mil) | Manufacturer/Supplier |
|---|---|---|
| Mylar | 0.15 to 5 | DuPont, Inc., USA |
| Tedlar | 0.15 to 5 | " |
| Vectran | 0.2 to 5 | Hoechst-Celanese, USA |
| Kapton | 0.1 to 4 | DuPont, USA |
| LC-Polyfilm | 0.1 to 6 | Foster-Miller, USA |

It is important to note that the resin to be utilized in the uni-tapes is a flexible resin when cured, as opposed to being an epoxy based hardened resin.

As such, the resin which bonds the monofilaments together in a matrix is either an elastomeric thermoset material, a thermoplastic material, or a hot melt adhesive such as described in Table III hereinafter; these are all elastomeric polymer materials.

TABLE III

MATRIX MATERIALS

1) Elastomeric Thermosets a) Urethanes, Example: Hysol US0028
b) Polyesters, Example: Thiokol Adcote 122
c) Silicones, Example: DOW-96-083, -X3-6930, -6858 (UV curable)

2) Thermoplastics a) Nylon
b) Low Density Polyethylene
c) Polypropylene
d) Engineering Thermoplastics (Peek, PPS, Radel, Ryton..)

3) Hot Melt Adhesives a) Polyolefins
b) Polyamides

Figure 3:
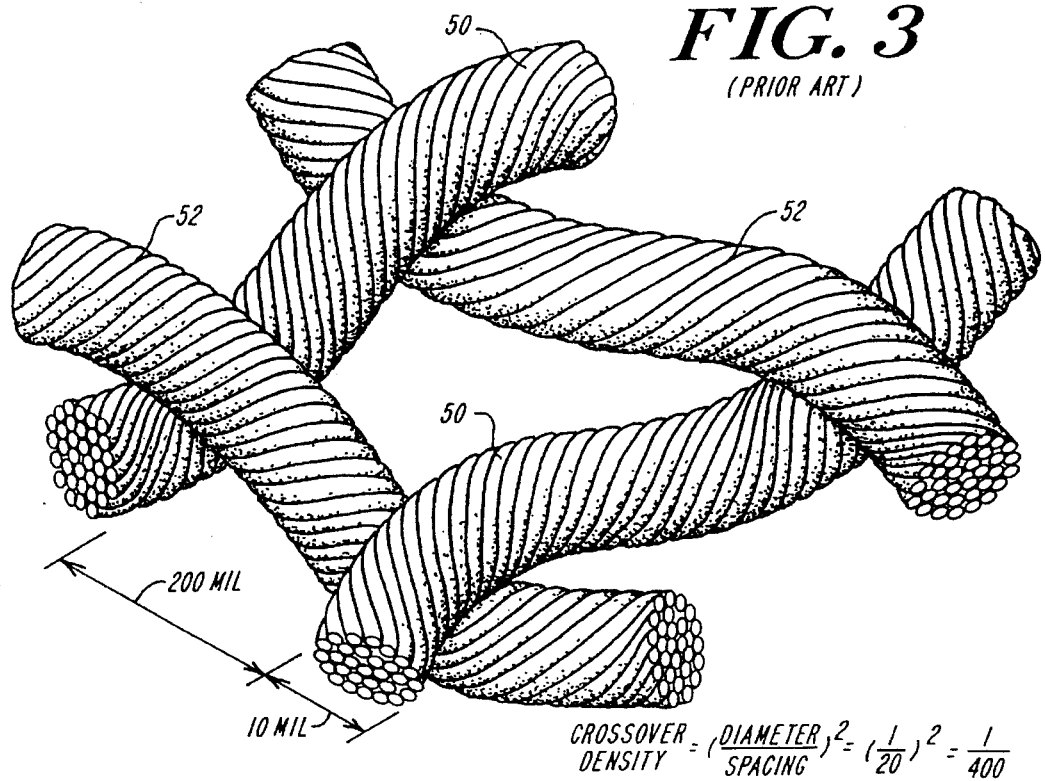
FIG. 3 is a diagrammatic representation of the crossovers in a woven product, in which the weft elements and the warp elements are strands or threads having diameters which exceed ten mils, thereby limiting the available crossover density and thus the ultimate strength of the material.

Referring now to FIG. 3, a typical warp and weft lattice is illustrated in which threads or strands 50 are interwoven with strands 52. It will be appreciated that typically the threads or strands have an overall diameter of 10 mils with the strands or threads being on 200 mil centers. Because of the relative thickness of the threads or strands, the crossover density is about 1/400, which precludes the advantages in shear strength achievable by the use of monofilaments.

Figure 4:
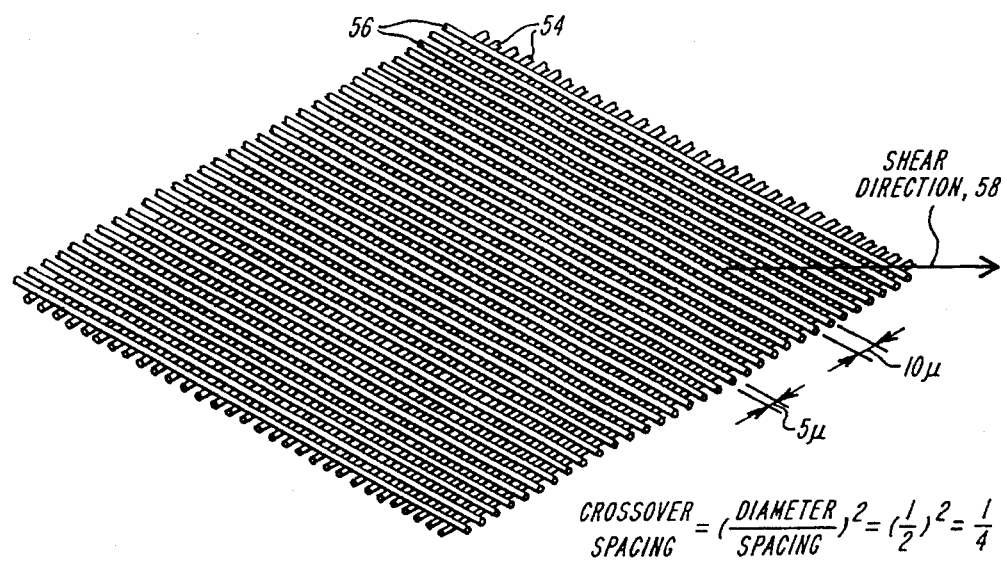
FIG. 4 is a diagrammatic representation of the subject reinforcing system using monofilaments having diameters at least in order of magnitude less than those associated with strands or threads for imparting to the reinforced material improved strength and shear resistance proportional to the much increased crossover density made possible by the small diameter monofilaments.

Referring now to FIG. 4, the subject monofilaments 54 and have approximately 5 micron diameters on 10 micron centers. This provides a crossover density of ¼. Note, these diameters are at least 5 times less than those associated with threads or strands. Due to the two order of magnitude improvement in crossover density, the shear strength in the direction illustrated by arrow 58 is dramatically increased. This means reinforcing materials of monofilaments are preferred for all applications in which a lightweight, stretch resistant, extremely strong fabric or material is desired. Moreover, crimp and the associated settling problems are virtually eliminated.

Figure 5:
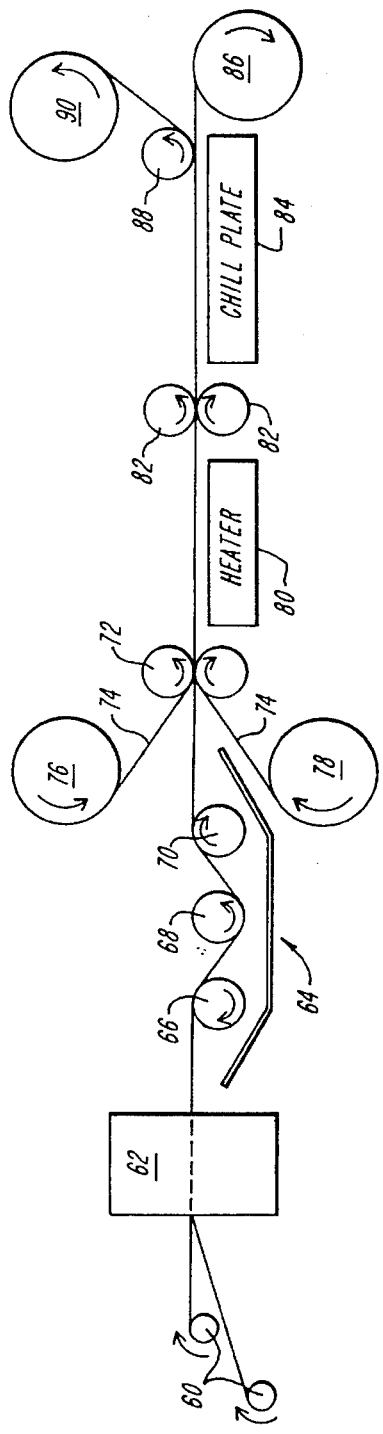
FIG. 5 is a schematic diagram of the process utilized for providing a uni-tape reinforced laminate, illustrating the provision of bands or tows with extruded monofilaments, with the multiple side-by-side bands being treated to facilitate adhesive bonding of the exterior surface of the monofilaments prior to pull-trusion into a unified tape.
Figure 6:
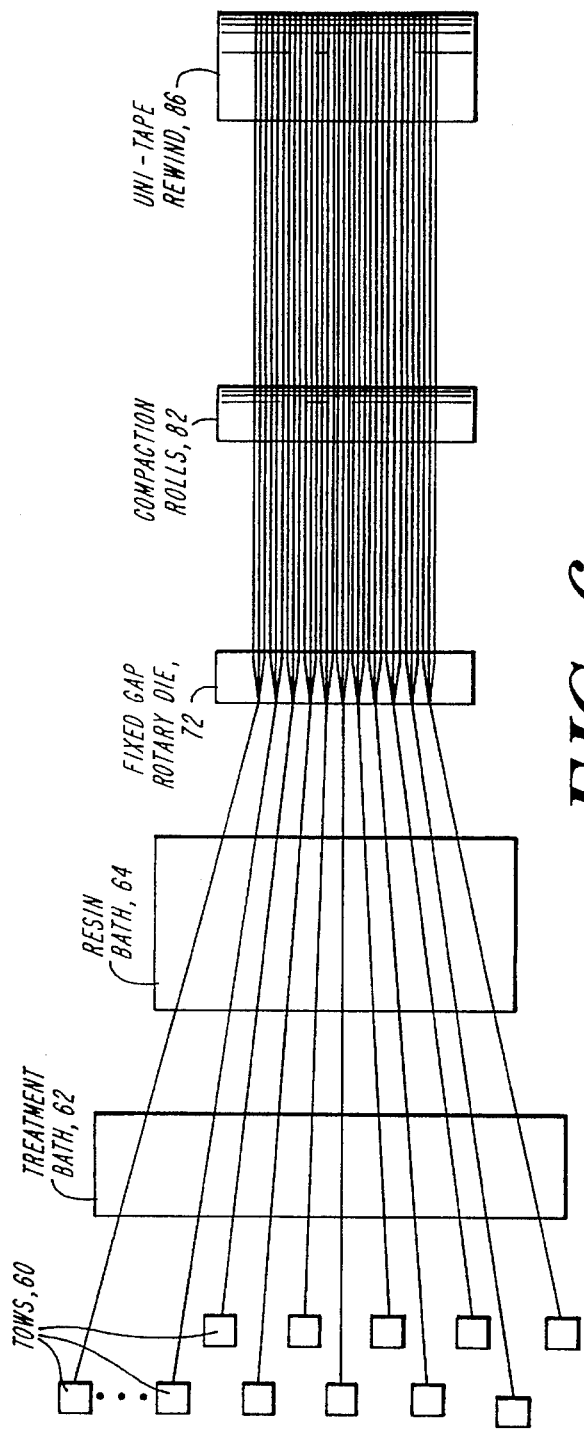
FIG. 6 is top view of the process of FIG. 5 illustrating the marrying of as many as 1000 bands or tows into a unified tape.

Referring now to FIGS. 5 and 6 simultaneously, the fabrication of the uni-tapes is now described. Tows or bands 60 provide the extruded monofilaments which are optionally passed through a treatment bath 62 to improve adhesive bonding features of the exterior of the monofilaments via chemical etching, plasma arc etching or corona discharge etching. Depending on the monofilament material utilized, this step is desirable to provide a secure crossover bond. The pretreated monofilaments from the tows are pulled through a resin bath 64 over and under rolls 66, 68 and 70 at which the matrix resin coats and surrounds the monofilaments.

The resin-coated monofilaments are drawn through a fixed gap rotary die 72, with release paper 74 from rolls 76 and 78 applied top and bottom prior to the pulling of the tows through the fixed gap rotary die which controls resin content and spreads the filaments. During the pull-trusion process, the individual tows are laterally married to form a tape which is heated by a heater 80 for viscosity change, after which the tape is compacted via rolls 82. The compacted tape is then passed over a chill plate 84 to a rewind roll 86, with the top sheet of release paper being removed at roll 88 and reeled up on a roll 90. The uni-tape is thus provided on a roll that may be as wide as 27 inches, or even wider as equipment permits.

Figure 7:
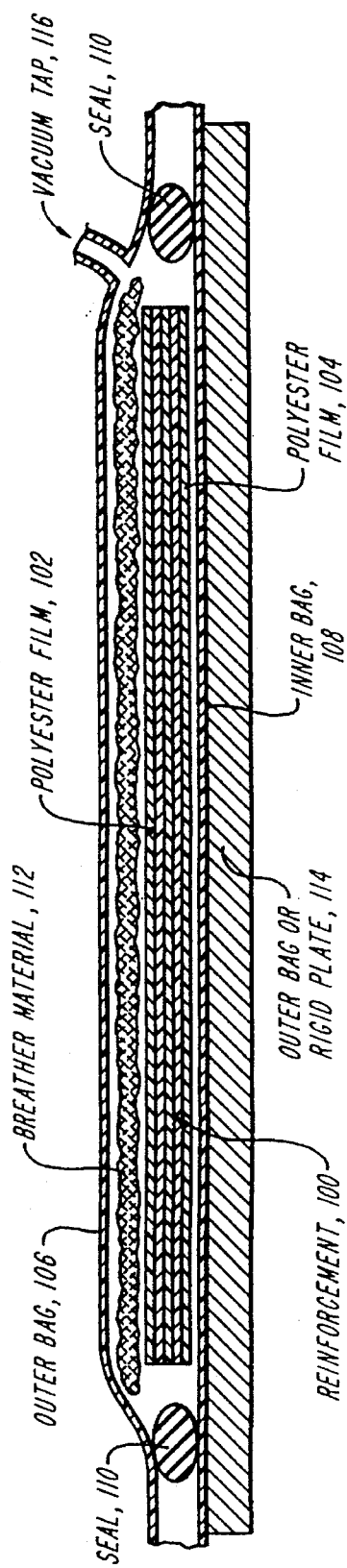
FIG. 7 is a sectional view of an autoclaving operation in which the elements are sandwiched between inner and outer bags on top of a platen prior to the autoclaving process to provide a laminate of the uni-tape reinforcing elements between two sheets of polyester film to produce a void free laminate.

Referring now to FIG. 7, in the fabrication of the final laminate by autoclaving, various layers 100 of uni-tape material are provided between two polyester films 102 and 104. The films are sandwiched between an outer bag 106 and an inner bag 108, with sealing provided by seals 110 as illustrated. A breather material 112 may be positioned between top film 102 and outer bag 106 for the purpose of gas pressure equilibration during evacuation of the bag, and thereafter to evenly distribute evolved gas so that it may be evenly entrained in the laminate to prevent void formation.

Finally, the entire back structure is positioned over a rigid plate or platen 114, and the bag is then evacuated at the vacuum tap 116.

Figure 8:
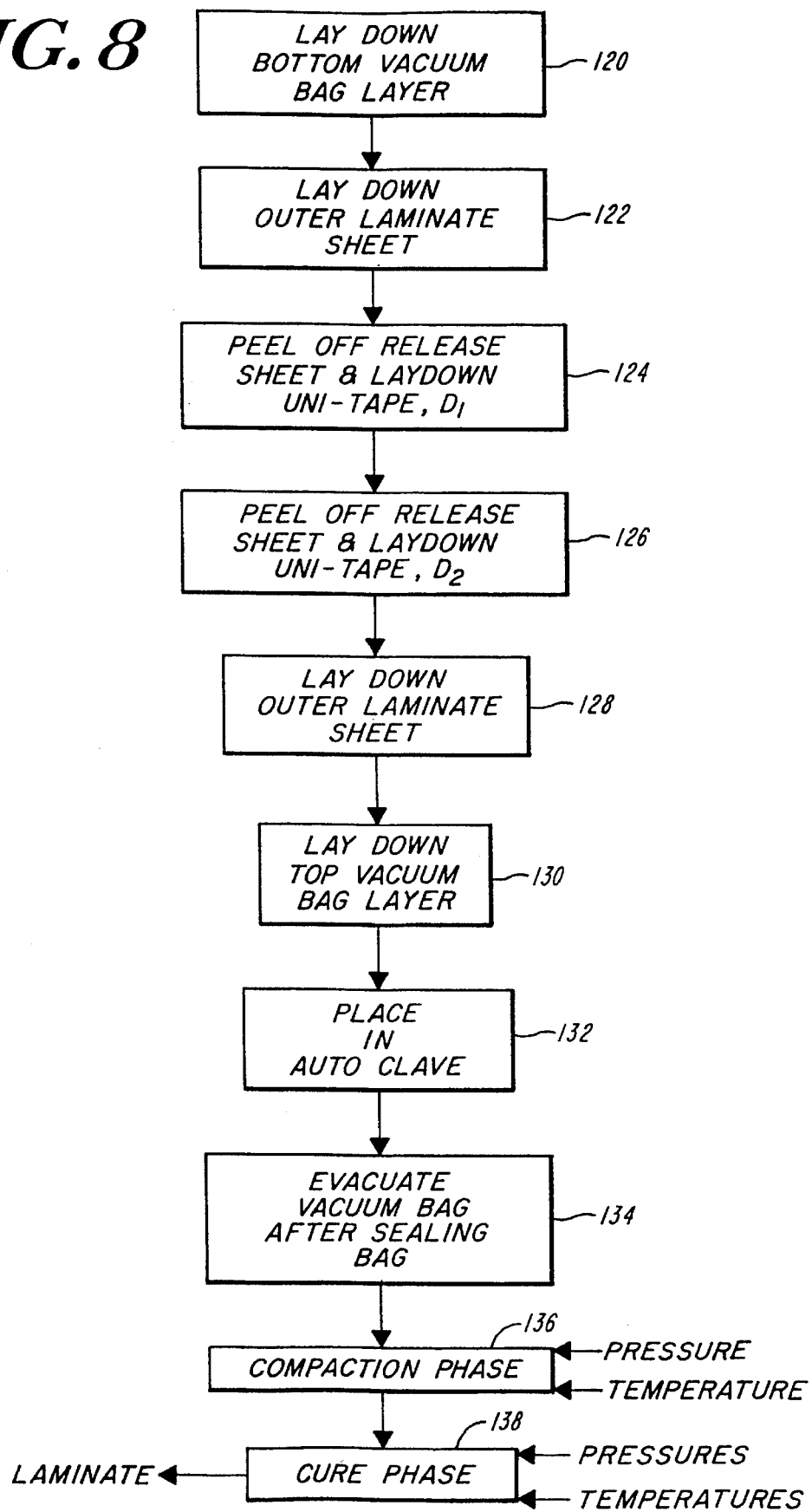
FIG. 8 is a flow chart illustrating the steps in producing the subject laminated product; and, FIG. 9 is graph illustrating one embodiment of the time/temperature and pressure profile for a typical autoclaving process.

During the autoclave process as illustrated in FIG. 8, the process steps are first to lay down the bottom vacuum bag layer as illustrated at 120. Secondly, one lays down the bottom sheet 122 to be laminated, followed by the peeling off of the release sheet and laying down the first of the uni-tapes as illustrated at 124. Thereafter as illustrated at 126, a second uni-tape is laid down after removal of its release sheet. Thereafter, the top or outer sheet is laid down as illustrated at 128, followed by the laying down of the top vacuum bag layer as illustrated at 130. The entire structure thus formed is placed in the autoclave as illustrated at 132 and the vacuum bag is evacuated after sealing its edges as illustrated at 134.

Thereafter follows a compaction phase as illustrated at 136 at the requisite pressures and temperatures followed by a curing phase as illustrated at 138 at associated pressures and temperatures.

Figure 9:
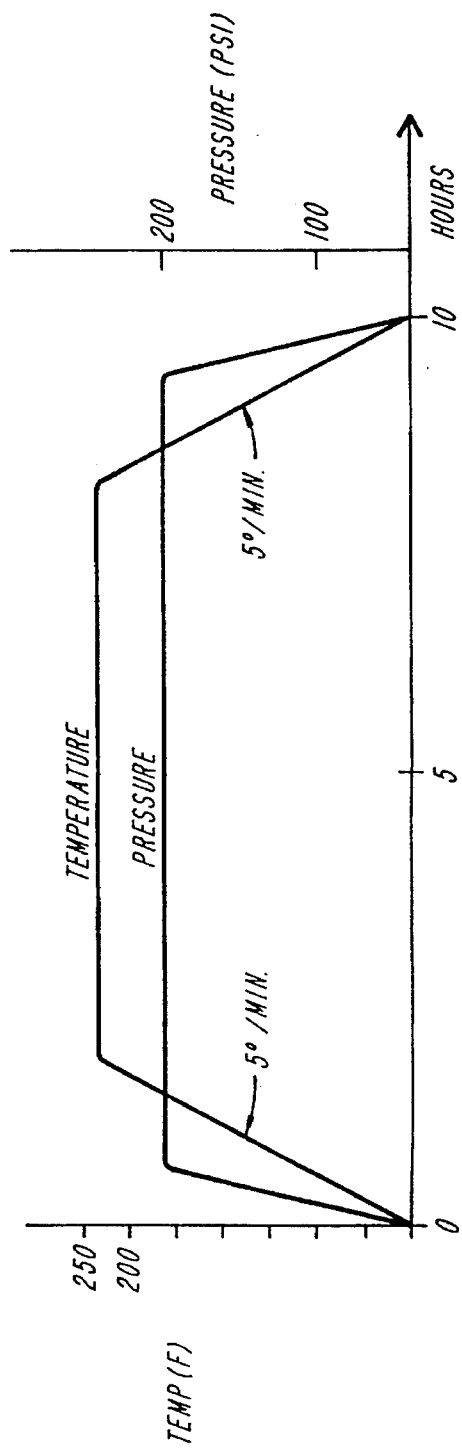

One set of pressures and temperatures is illustrated in FIG. 9 by the temperature time graph and associated temperature pressure graph.

It will be appreciated that there are a number of laminating methods which do not involve the autoclave bag curing method described above Such methods include vacuum bag curing with heat and/or UV light, the utilization of a rotary laminating press using heat and pressure or pressure combined with UV light to cure the laminate, and the use of a heated platen press.

What follows is a description of the uni-tape formation and laminate formation process.

In one embodiment, the laminate can be made in accordance with the following method:

1) Load carbon and polymer tows onto creel or beam.

2) The tows are run through the surface treatment stage and then are threaded through combs to adjust distribution of monofilaments in the resulting web and the web width. The rotary die gap is set to a predetermined thickness to control the resin content and spread the material.

3) Release paper is loaded into the rotary gap die machine.

4) Tows are run through resin bath and sandwiched between the release paper.

5) The web of monofilaments is pull-truded through the rotary gap die to form the uni-tape. As the material passes through the sequential zones it first passes through the fixed gap rotary die where the monofilaments and resin are amalgamated to form the thin uni-tape. The web then passes through a heating zone to ensure that the resin has flowed uniformly through the material and that all solvents have been removed. It then passes through a second set of dies to spread it into a uniform layer. The web is then cooled to thicken the resin. The material is then run through a third set of dies to ensure that the uni-tape is fully compacted. The top layer of release paper is removed and the web is rolled tightly onto a core.

6) The rolls are removed from the machine and brought over to a layup table. The first layer is rolled onto the table in a 0 degree orientation, with the release paper facing the surface of the table.

7) The next layer is aligned on top of the first at a predetermined angle with the release paper side facing up so that there is contact between the two layers of uni-tape. Heat and pressure are applied briefly to the material to tack bond the two layers together. This process is repeated until all layers are tacked together. For angled uni-tapes they may be laid edge to edge over the 0° uni-tape to obtain the required width of laminate.

8) The release paper is removed from the outer layer and is replaced by a layer of polymer film. The paper is then removed from the under side of the composite and is replaced by a second layer of film.

9) The material is then laid on a caul sheet and covered with breather material The vacuum bag film is placed on top of the breather and sealed to the caul with a tacky sealant for airtightness. The area inside the bag is then subjected to a vacuum of about 29" Hg.

10) The bag set up is placed in an autoclave and cured at about 200 psi for a predetermined time and temperature profile such as that illustrated in FIG. 9.

It will be appreciated that tows having different monofilaments of different composition may be co-located side-by-side such that the uni-tape formed has favorable characteristics which are drawn from all the different monofilament materials. Specifically, when marrying carbon with polymer fibers it has been found that the properties of the finished material exceeds predictions, such that the sum of the individual characteristics of each of the different monofilaments is exceeded. In one embodiment, combining carbon monofilaments with polymer monofilaments results in a significant off-axis property increase. Thus, it is possible to combine monofilaments of differing constituents to provide a hybrid composite having favorable characteristics, rather than displaying the weakensses of each component.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A material for use as a flexible foldable sheet having improved shear strength comprising:

a laminate including reinforcing elements therein, said reinforcing elements including at least two unidirectional tapes, each having extruded monofilaments therein, all of such monofilaments lying in a predetermined direction within the tape, said tapes being placed one atop the other within the laminate in a crossed fashion, with the monofilaments of one tape being at an angle to the monofilaments of an adjacent tape.

2. The material of claim 1, wherein said unidirectional tapes are formed in a pull-trusion process to provide a pull-truded tape.

3. The material of claim 1, wherein said tape includes a monofilament and resin matrix and wherein said resin is flexible when cured, such that the resulting reinforced laminate is both flexible and foldable.

4. The material of claim 1, wherein said laminate includes a top and bottom film, with said reinforcing elements sandwiched therebetween, said laminate being free of voids therein.

5. The material of claim 1, wherein said monofilaments have diameters less than 20 microns for permitting an increase in crossover density.

6. A reinforcing element for use within a laminate comprising a unidirectional tape having monofilaments running in one direction therethrough, said tape having been made by passing side-by-side bands having extruded monofilaments therein through a resin bath and passing the resin-coated bands through fixed gap pinch rollers which marry the individual bands into a tape.

7. The reinforcing element of claim 6, wherein said resin is flexible when cured.

8. The reinforcing element of claim 6, wherein the unified tape from the rotary die is first heated and then cooled.

9. A flexible foldable composite sheet comprising top and bottom films, and unidirectional tape reinforcing elements laminated between band films, each tape reinforcing element having monofilaments therein, with the directions of the monofilaments in adjacent tapes being different.

10. The composite sheet of claim 9, wherein the laminate is formed via autoclaving.

11. The composite sheet of claim 9, wherein the laminate is formed by heat and pressure.

12. The composite sheet of claim 11, wherein the laminate is cured by UV light.

13. The composite sheet of claim 9, wherein the laminate is formed by confining said laminate top and bottom with over and underlying sheets respectively and providing a silicone interliner adjacent the laminate, said interliner expanding with heat to provide uniform pressure to effectuate lamination without the formation of voids by forcing evolved gas back into the laminate.

14. The composite of claim 9, wherein each tape includes monofilaments of different material.

15. The composite of claim 14, wherein said different material are carbon and polymers.

* * * * *